(12) United States Patent
Mestha et al.

(10) Patent No.: US 6,757,076 B1
(45) Date of Patent: Jun. 29, 2004

(54) SYSTEMS AND METHODS FOR DEVICE INDEPENDENT COLOR CONTROL TO ACHIEVE ACCURATE COLOR PROOFING AND REPRODUCTION

(75) Inventors: Lingappa K. Mestha, Fairport, NY (US); Fred F. Hubble, III, Rochester, NY (US); Michael R. Furst, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/461,042

(22) Filed: Dec. 15, 1999

(51) Int. Cl.[7] .............................................. H04N 1/46
(52) U.S. Cl. ........................ 358/1.9; 358/504; 358/518
(58) Field of Search ........................ 358/1.9, 518, 523, 358/504; 382/162, 167

(56) References Cited

U.S. PATENT DOCUMENTS

| | | | |
|---|---|---|---|
| 4,959,669 A | | 9/1990 | Haneda et al. |
| 5,200,816 A | | 4/1993 | Rose |
| 5,339,176 A | | 8/1994 | Smilansky et al. |
| 5,357,448 A | | 10/1994 | Stanford |
| 5,612,902 A | * | 3/1997 | Stokes .................. 364/526 |
| 5,771,311 A | | 6/1998 | Arai |
| 5,809,213 A | | 9/1998 | Bhattacharjya |
| 5,950,040 A | | 9/1999 | Mestha et al. |
| 5,995,240 A | * | 11/1999 | Sato ..................... 358/407 |
| 6,005,970 A | | 12/1999 | Ohneda et al. |
| 6,048,117 A | * | 4/2000 | Banton ................ 400/120.09 |
| 6,052,195 A | | 4/2000 | Mestha et al. |
| 6,081,353 A | | 6/2000 | Tanaka et al. |
| 6,157,469 A | * | 12/2000 | Mestha .................. 358/504 |
| 6,172,681 B1 | | 1/2001 | Ueda |
| 6,185,385 B1 | | 2/2001 | Mestha et al. |
| 6,188,786 B1 | | 2/2001 | Ueda et al. |
| 6,215,561 B1 | | 4/2001 | Kakutani |
| 6,236,474 B1 | | 5/2001 | Mestha et al. |
| 6,292,195 B1 | | 9/2001 | Shimizu et al. |
| 6,323,969 B1 | | 11/2001 | Shimizu et al. |
| 6,337,922 B2 | * | 1/2002 | Kumada ................. 382/162 |
| 6,344,902 B1 | | 2/2002 | Duke et al. |

FOREIGN PATENT DOCUMENTS

| | | |
|---|---|---|
| EP | 0491131 A2 | 6/1992 |
| EP | 0 582 997 A1 | 2/1994 |
| EP | 0625847 A1 | 11/1994 |
| EP | 0811829 A2 | 12/1997 |
| EP | 0 868 074 A1 | 9/1998 |
| EP | 0915615 A2 | 5/1999 |
| WO | WO 97/34409 A2 | 9/1997 |

OTHER PUBLICATIONS

U.S. patent application Ser. No. 09/487,587, Wang et al., filed Jan. 19, 2000.
U.S. patent application Ser. No. 09/221,996, Mestha et al., filed Dec. 29, 1998.
U.S. patent application Ser. No. 10/248,387, Mestha et al., filed Jan. 15, 2003
U.S. patent application Ser. No. 09/487,586, Mestha et al., pending.
U.S. patent application Ser. No. 09/566,291.
Bens, R.S.: "Spectral modeling of a Dye Diffusion Thermal Transfer Printer" Journal of Electronic Imaging, vol. 2, No. 4, Oct. 1993, pp. 359–370.

* cited by examiner

Primary Examiner—Thomas D. Lee
(74) Attorney, Agent, or Firm—Oliff & Berridge, PLC

(57) ABSTRACT

A device independent color control server and control methods provide color consistency services and improve consistent color document appearance between any number of connected color image forming devices and/or color display monitors on a distributed network.

32 Claims, 4 Drawing Sheets

SYSTEMS AND METHODS FOR DEVICE INDEPENDENT COLOR CONTROL TO ACHIEVE ACCURATE COLOR PROOFING AND REPRODUCTION

BACKGROUND OF THE INVENTION

1. Field of Invention

This invention relates to color reproduction.

2. Description of Related Art

Generally, documents, including color documents, can be transmitted and received over a network. Furthermore, color documents can be sent to and output by a networked color image forming device, such as, for example, a color printer.

Additionally, if a color document is outputted on two different color image forming devices, the two outputted color documents, when compared side-by-side, can show variations in color tone, saturation, and hue. The level of variation can be slight, and barely noticeable, or the level of variation can be extreme and very noticeable. Furthermore, if either of the two outputted color documents is compared to an image of the color document displayed on a color display monitor of, for example, a computer, variations will be noticeable between the printed color document and the displayed color document.

Color matching techniques, or color matching, match the color characteristics of one color device to the color characteristics of another color device. Color matching is generally used when color images are transferred between different color devices, such as, for example, between color display monitors, color scanners, or color marking devices. Color matching is necessary because different color devices usually describe color in different terms, usually operate in different color spaces, and usually have different color capabilities.

For example, most color display monitors, such as, for example, color computer monitors, display colors in the red/green/blue (RGB) color space, i.e., with respect to the amount of red, green, and blue that a particular displayed color contains. Using this technique, the color yellow, for example, is displayed on a color display monitor by combining a red image value of 255 red with a green image value of 255 green and a blue image value of zero.

Furthermore, the red, green, and blue (RGB) color values associated with the particular colors for a color display monitor are device dependent. This means that the RGB values associated with a particular color, viewed on a specific color display monitor, are unique to that specific color display monitor or, at least, to that brand of color display monitor. Simply put, because RGB color values are device dependent, if identical RGB color values, such as, for example, a red image value of 255 red, a green image value of 255 green, and a blue image value of zero, are input and displayed on two different color display monitors, the resulting yellow color displayed on the two color display monitors will probably not appear exactly alike.

Similarly, most color image forming devices output colors in device dependent terms. However, unlike most color display monitors, most color marking devices use a cyan, magenta, yellow, and black (CMYK) color space, i.e., a combination of cyan, magenta, yellow and black (CMYK) to arrive at the color marking device's outputted colors. Consequently, as with RGB color values, CMYK color values are device dependent as well. Thus, as described above with respect to colors being displayed on color display monitors, if identical CMYK colors are printed on two different color marking devices, the outputted colors will probably not appear exactly alike.

To add to the complexity of color matching between color image forming devices, different color image forming devices can use different types of toners, dyes, pigments, or inks to produce the outputted color images. Likewise, the color images can be produced on a wide range of copy media. Images can be produced, for example, on copy media ranging from paper to plastic, from fabric to metal. In each case, each combination of colorant and media produces a different optical appearance.

Moreover, different color devices have different color capabilities. Every color device, whether it is a color scanner, a color marking device, or a color display monitor, has a color gamut, i.e., a range of colors that it can capture, produce, or display. To illustrate the problems encountered when color matching is attempted between two different devices having two different color gamuts, consider color display monitors and color marking devices. Most color display monitors can display hundreds of thousands of colors. Conversely, color marking devices usually have a significantly smaller number of producable colors. Therefore, the gamut of a color display monitor usually exceeds the gamut of a color marking device. Thus, some of the colors that can be displayed on a color display monitor cannot be produced by a color marking device.

In an attempt to solve the problem of color matching, various color matching techniques have been developed that use models to translate colors from one color space to another color space. These models usually manifest themselves in the form of predetermined multi-dimensional look-up tables. These predetermined multi-dimensional look-up tables translate colors from one color space to another color space while attempting to maintain the translated color's perceived appearance. For example, if a user creates an image on a color display monitor and subsequently outputs the created image without any color matching, the colors observed on the outputted image may differ significantly from the colors originally observed on the color display monitor. However, if some type of color matching model is used, the discrepancies between the originally observed colors on the color display monitor and the colors observed on the outputted image can be reduced.

One method of creating and updating a multi-dimensional look-up table is to is provide a color sensor inside each color marking device. This embedded color sensor is used to measure the color characteristics of the color marking device by measuring the color characteristics of an outputted color patch pattern. Feed-back information about the color characteristics of the outputted color patch pattern is then provided to the color marking device to improve further color reproduction. For example, U.S. patent application Ser. No. 09/083,203, incorporated herein by reference in its entirety, discloses a method of reducing and controlling color drift between a desired image and an output image printed by a marking device that is intended to match the desired image. In the 203 application a current output color in the output image is detected with a color sensing device. A difference between the current output color in the output image and a corresponding color in the desired image is then determined. A next output color in the output image is automatically set equal to a corrected color that minimizes the difference between the next output color and the corresponding color in an output image. Preferably, this is done on a real-time basis.

Additionally, in U.S. patent application Ser. No. 09/083, 202, incorporated herein by reference in its entirety, the error in an output color of a colored output image in a marking device intended to match a desired image is reduced. In the 202 application, a current output color in the output image is detected with a color sensing device. A difference between the current output color and a corresponding target color under standard conditions is determined. A marking device input-output relationship for a next output color is automatically set based on the difference between the current output color and the corresponding target color under standard conditions to minimize the difference between the next output color and the corresponding target color.

Furthermore, in U.S. patent application Ser. No. 09/083,114, incorporated herein by reference in its entirety, colorants are mixed to achieve a target color by combining individual colorants, detecting an output color of the combined colorants with a color sensing device and automatically adjusting the output color based on comparison between the detected output color and the target color.

SUMMARY OF THE INVENTION

Using current color matching techniques, relatively close color matching can be achieved between marking devices if a properly calibrated device, such as, for example, a digital front end (DFE), is used to drive the marking devices. However, because uniformly producing correctly calibrated color documents is one of the most difficult aspects of color document services, the quality of color documents can not be guaranteed between different marking devices.

Thus, for a digital front end (DFE) to be effective, it must be either manually calibrated by a color specialist or calibrated using a color patch pattern and a color scanner, as described above. Unfortunately, allowing different color specialists to calibrate different digital front ends (DFEs) can lead to inconsistent calibration of the digital front ends (DFEs). Furthermore, even if the color patch pattern technique is used to help calibrate a color marking device, it still remains difficult to guarantee that a color marking device in another location has been properly calibrated. This inconsistent or unverifiable calibration, in turn, produces inconsistent color reproduction between marking devices. Thus, eventually, even calibrated marking devices often fail to maintain consistent color outputs.

Furthermore, once a particular marking device has been calibrated, it is difficult to determine how long the marking device will remain in calibration. Over time, the color quality of the documents printed by a previously calibrated marking device will deteriorate, or drift.

Additionally, when a marking device is calibrated, the marking device is calibrated with respect to a particular type of colorant and a particular type of copy media. Thus, each time a different type of colorant or copy media is used, the marking device must be re-calibrated. If the marking device is not re-calibrated, the marking device will function as an un-calibrated marking device.

Consequently, it is nearly impossible to guarantee that the color characteristics and quality of an outputted document, for example, downloaded from a network by two different users, and printed using two different printers, will have the same color appearance. Likewise, it is nearly impossible to guarantee that the color characteristics and quality of an outputted document, will match the color characteristics and quality of the document as it appears on a color display monitor.

This invention provides systems and methods that enable color matching or consistency between color image forming devices without requiring the intervention of either a user or a color specialists.

This invention separately provides a device independent color control (DICC) server that provides spectral or colorimetric matching of images printed on different color marking devices. This invention separately provides device independent color control systems and methods that use a standalone device independent color control (DICC) server to provide improved color consistency between different marking devices and/or display devices. This invention separately provides device independent color control software installed on a general network server. This invention separately provides systems and methods that use a specialized hardware-independent device independent color control (DICC) printer-only server.

This invention separately provides device independent color control systems and methods that use a standalone device independent color control (DICC) server and associated devices and techniques to provide color consistency services and to improve consistent document appearance between any number of connected image forming devices and/or display devices on a distributed network.

This invention separately provides a device independent color control server that is a separate hardware/software unit.

This invention separately provides device independent color control systems and methods that analyze a color document printed by a particular color marking device, and, based on that analysis, calibrates that particular color marking device.

This invention separately provides device independent color control systems and methods that analyze a color pattern displayed by a particular color display monitor, and, based on that analysis, calibrates that particular color display monitor.

This invention separately provides device independent color control systems and methods that work over a network to service printers worldwide.

This invention separately provides device independent color control systems and methods that work over a network to service color display monitors worldwide.

This invention separately provides device independent color control systems and methods that improve globally consistent color reproduction.

This invention separately provides device independent color control systems and methods that render an "exact match" or an "optimal match" to color documents from the same or different image output terminals (IOT).

The color image forming devices can, for example, be color printers of similar or differing technologies. Thus, the device independent color control (DICC) server according to this invention will produce improved consistency of color outputs between separately outputted documents. Using the device independent color control (DICC) server according to this invention will result, for example, in five different color outputs of the same document having similar color characteristics, even if, for example, one copy of the color document is produced using a digital Xerox® printer, another copy is produced using a Xerographic printer, another copy is produced using a Xerox® DocuColor 40™ printer, another copy is produced using a Cannon® CLC1000™ printer, and yet another copy is produced using an ink jet NC20™ printer.

Various exemplary embodiments of a device independent color control server according to this invention include a non-contact, high speed color sensing device in an output paper path or on the output tray of each marking device, a server, and interface hardware for communicating between the marking devices, the sensors and the server.

In various exemplary embodiments, the device independent color control server includes a high speed color sensing device on the display of each color display monitor, a server computing platform, and interface hardware for communication between the displays, the sensors and the server.

In various exemplary embodiments, the server-computing platform executes specialized color control methods. In various exemplary embodiments, the server-computing platform is a stand-alone server-computing platform. In other exemplary embodiments, the server-computing platform is embedded within each marking and/or display device.

In various exemplary embodiments, the interface hardware is a specialized network plug-in card. In various other exemplary embodiments, the interface hardware is a combination of wireless transmitters and one or more wireless receivers.

In various exemplary embodiments, the apparatuses, systems and methods of this invention function either automatically or by selection of a routine, such as, for example, a "color warrantees" routine.

These and other features and advantages of this invention are described in or are apparent from the following detailed description of various exemplary embodiments of the systems and methods of this invention.

BRIEF DESCRIPTION OF THE DRAWINGS

Exemplary embodiments of the systems and methods according to this invention will be described in detail, with reference to the following figures, wherein.

DETAILED DESCRIPTION OF PREFERRED EMBODIMENTS

For simplicity and clarification, the operating principles, design factors, and layout of the device independent color control server systems and methods according to this invention are explained with reference to various exemplary embodiments of device independent color control server systems and methods as shown in FIGS. 1–4. The basic explanation of the operation of the device independent color control server system is applicable for the understanding and design of the constituent components employed in the device independent color control server systems and methods of this invention.

Figure 1:
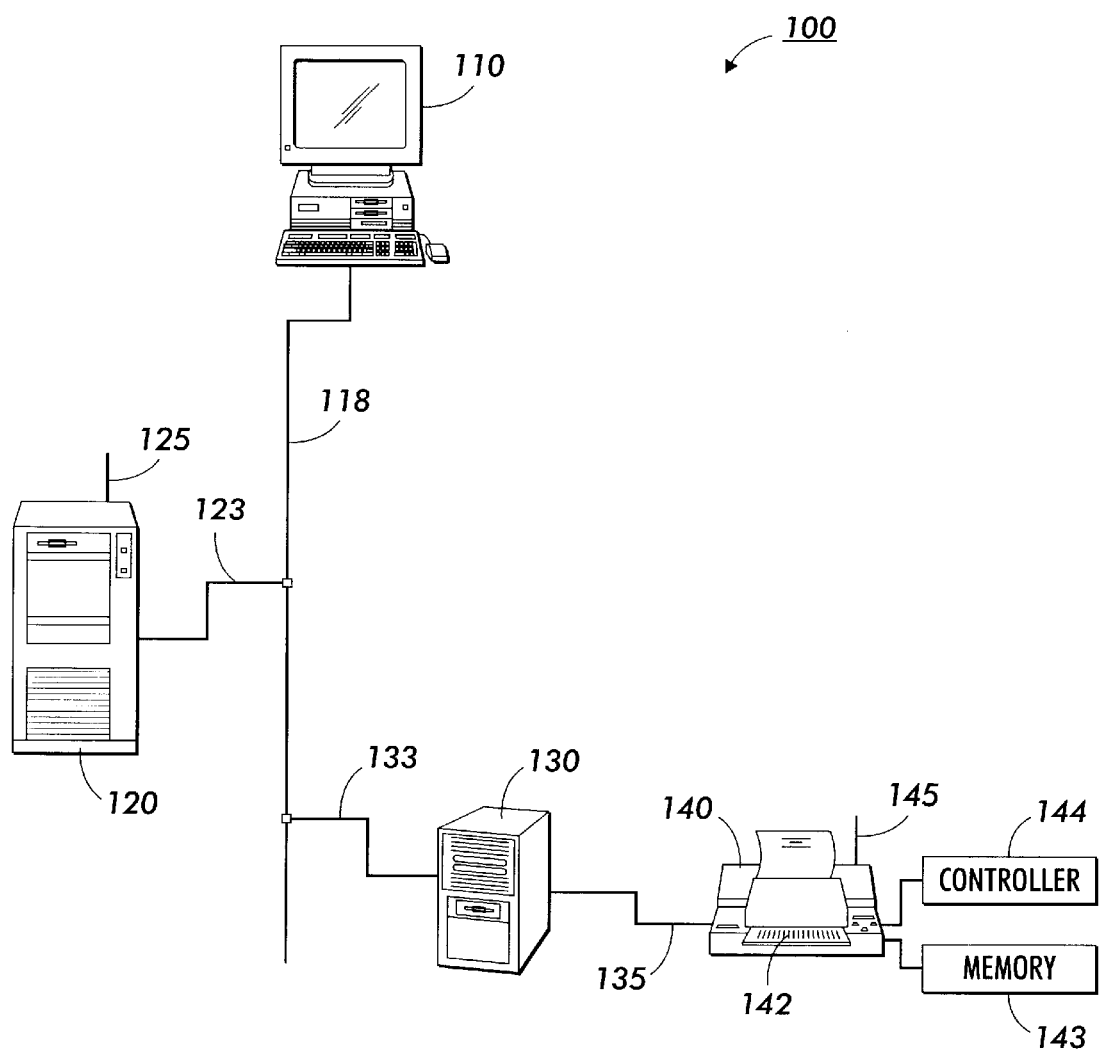
FIG. 1 is a first exemplary embodiment of a device independent color control server according to this invention.

FIG. 1 shows a device independent color control server system incorporating a first exemplary embodiment of a device independent color control (DICC) server system 100 according to this invention. As shown in FIG. 1, the device independent color control (DICC) server system 100 includes at least one color image data source 110, at least one device independent color control (DICC) server 120, and at least one color marking device 140. The color image data source can be a locally or remotely located desk top or laptop computer, a personal digital assistant (PDA), a scanner, a facsimile machine, a digital camera, or a device suitable for storing and/or transmitting electronic color image data, such as a client or server of a network, or the Internet, and especially the World Wide Web, or any known or later developed device that is capable of supplying color image data to the at least one device independent color control (DICC) server 120. The at least one color image data source 110 is connected, via an input/output circuit, to a network 118.

In the various exemplary embodiments described herein, the color image data source 110 interfaces, for example, with the network 118, via a wired connection, through an input/output circuit (not shown). Alternatively, the color image data source 110 can interface with the network 118 via any linked connection. The linked connection can be any known or later developed device or system for connecting the color image data source 110 to the network 118, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connection can be any known or later developed connection system or structure usable to connect the color image data source 110 to the network 118, including both wired and wireless connections.

The at least one device independent color control (DICC) server 120 includes a radio transmitter 125 and is connected, via a connection 123, to the network 118. In various exemplary embodiments, the DICC server 120 is a network server that can interface, via the network 118, with both each at least one color image data source 110 and each at least one color marking device 140. In various exemplary embodiments, the DICC server 120 acts as a print server. However, in addition to queue management, the DICC server 120 provides additional control functions for monitoring the at least one color marking device 140, and real-time modifying of the colors to be printed of jobs submitted to the at least one color marking device 140.

The at least one color marking device 140 interfaces, through a connection 135, with a driver, such as, for example, a digital front end (DFE) 130. The digital front end (DFE) 130, in turn, interfaces, via a connection 133, with the network 118. In various exemplary embodiments, the digital front end (DFE) 130 can be housed within the at least one color marking device 140.

In various exemplary embodiments, the at least one color marking device 140 includes a color sensor 142. The color sensor 142 includes a memory 143, a controller 144, and a radio transceiver 145. In various exemplary embodiments, the color sensor 142 measures one or more of the optical density of a color test patch outputted by the at least one color marking device 140, the trichometric description, such as, for example, XYZ or L*, a* or b*, of the color test patch outputted by the at least one color marking device 140, and/or the reflectance spectra of the color test patch outputted by the at least one color marking device 140.

In various exemplary embodiments, the color sensor 142 is mounted on the output tray of the color marking device 140. The color sensor 142 can also include a unique hardware connection that can be inserted into each type of color marking device's output tray to allow the collection of the necessary real-time timing information necessary to ensure proper sensing and data collection. The color sensor 142 transmits data after completing all the measurements from multiple sheets. Alternatively, the color sensor 142 transmits data during or after the marking of each sheet.

In various exemplary embodiments, the color sensor 142 is connected to the device independent color control (DICC) server 120, via the radio transceivers 145 and 125, through a wireless link. This wireless link enables the addition of new sensor/image forming device pairs to an existing device independent color control (DICC) server 120 with little additional wiring. This wireless link also relieves the demands placed on multiple configurations based on the particular combination of the at least one color marking device 140, the digital front end (DFE) 130, the color sensor 142, and the controller 144. The wireless link is used in part, because any of these devices, in a particular implementation, may not support the two-way exchange of control information to and from the device independent color control (DICC) server 120 over the network 118. Furthermore, the wireless link allows the systems and methods of this invention to be added to marking devices that are not otherwise able to support the systems and methods of this invention.

In various other exemplary embodiments, the color sensor 142 is connected to the device independent color control (DICC) server 120 through other connection schemes, such as, for example, a direct connection through the color marking device's output tray and controller to the device independent color control (DICC) server 120 via the network 118, or a direct connection to the network 118 via an additional network port.

The memory 143 can store at least one master patch pattern that can be output by the at least one color marking device 140. The patch pattern can include a generic set of "master colors". Alternatively, the patch pattern can include a set of job specific "master patches" that can be sent prior to a particular job, if special calibration is required.

The controller 144 can activate the color sensor 142 and cause the color sensor 142 to measure the patch pattern that is outputted by the at least one color marking device 140. The controller 144 interfaces, via the radio transceiver 145, over a wireless link, with the device independent color control (DICC) server 120.

In the various exemplary embodiments described above, the device independent color control (DICC) server 120 interfaces, for example, with the color sensor 142, and more specifically, with the controller 144, via a wireless link using the radio transceiver 145. Alternatively, the device independent color control (DICC) server 120 can interface with the color sensor 142, and more specifically, with the controller 144, via any linked connection. The linked connection can be any known or later developed device or system for connecting the device independent color control (DICC) server 120 to the color sensor 142, and more specifically, to the controller 144, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connection can be any known or later developed connection system or structure usable to connect the device independent color control (DICC) server 120 to the color sensor 142, and more specifically, to the controller 144, including both wired and wireless connections.

During operation of the device independent color control (DICC) server system 100 according to this invention, the device independent color control (DICC) server 120, transmits a signal, via the radio transceiver 125 to the controller 144, via the radio receiver 145. In response to the signal from the device independent color control (DICC) server 120, the controller 144 causes the at least one color marking device 140 to output the at least one master patch pattern stored in the memory 143.

In various exemplary embodiments, the device independent color control (DICC) server 120 transmits the signal to the controller 144 as part of a periodic color warrantee routine. In other exemplary embodiments, the device independent color control (DICC) server 120 transmits the signal to the controller 144 in response to a specific user input. In other exemplary embodiments, the device independent color control (DICC) server 120 transmits the signal to the controller 144 as part of a job cover sheet. In this case, the signal is transmitted over the network 118 as part of a print job defining the images to be outputted. In various other exemplary embodiments, the detection and extraction of color data is from a submitted print job while the submitted print job is performed.

The patch pattern outputted by the at least one color marking device 140 can be transmitted to the at least one color marking device 140 from the device independent color control (DICC) server 120. Alternatively, the patch pattern can be stored locally at the at least one color marking device 140.

Next, in one exemplary embodiment, the device independent color control (DICC) server 120 monitors the digital front end 130 until the patch pattern is the next job to be outputted by the at least one color marking device 140. If the patch pattern is the next job to be outputted by the at least one color marking device 140, the device independent color control (DICC) server 120 activates, via the controller 144, the color sensor 142. The color sensor 142 then measures the patch pattern, as discussed above, as it is outputted by the at least one color marking device 140.

Alternatively, instead of requiring the device independent color control (DICC) server 120 to monitor the digital front end 130 until the patch pattern is the next job to be outputted, the controller 144 can receive a command from, for example, the digital front end (DFE) 130 that the patch pattern is the next job to be outputted by the at least one color marking device 140.

Optionally, the color sensor 142 can monitor all jobs outputted by the at least one color marking device 140 for the patch pattern to be outputted by the at least one color marking device 140.

The controller 144 then transmits, via the radio receiver 145, the measured color values detected by the color sensor 142 to the device independent color control (DICC) server 120. Next, the device independent color control (DICC) server 120 receives, via the radio transceiver 125, the measured color values.

Once the device independent color control (DICC) server 120 receives the measured color values, the device independent color control (DICC) server 120 analyzes the color levels detected by the color sensor 142. The device independent color control (DICC) server 120 then compares the color levels detected by the color sensor 142 to the color levels of the patch pattern input into the color marking device 140.

If the device independent color control (DICC) server 120 determines that the color levels are not within an acceptable range of equivalents, the device independent color control (DICC) server 120 sends, via the network 118, an updated color modification signal to the color modification system incorporated into the digital front end 130. However, if the device independent color control (DICC) server 120 determines that the color levels are within an acceptable range of equivalents, the device independent color control (DICC) server 120 does not update the color system incorporated in the digital front end 130.

Thus, in the device independent color control (DICC) server 120, the color space of the input job is translated into the current "drift space" of the image forming device determined in a process similar to that described above, such as, for example, through the use of a look-up table. The appropriate control information is then added to the job. Next, the job is submitted to the digital front end (DFE) 130 for interpretation and rasterization and is sent to the color marking device 140 to be outputted.

While FIG. 1 shows the at least one color marking device 140 as a separate device from the color image data source 110, the color image data source 110 may be incorporated into an integrated device, such as a digital copier, a computer with a built-in printer, or any other integrated device that is capable of producing a hard copy color image output. With such a configuration, for example, the color image data source 110, the at least one color marking device 140, the color sensor 142, the controller 144, and the radio transceiver 145 may be contained within a single device.

Alternatively, the at least one color marking device 140 may be a separate device containing the color sensor 142, the controller 144, and the radio transceiver 145 attachable downstream of a color image data source 110.

Figure 2:
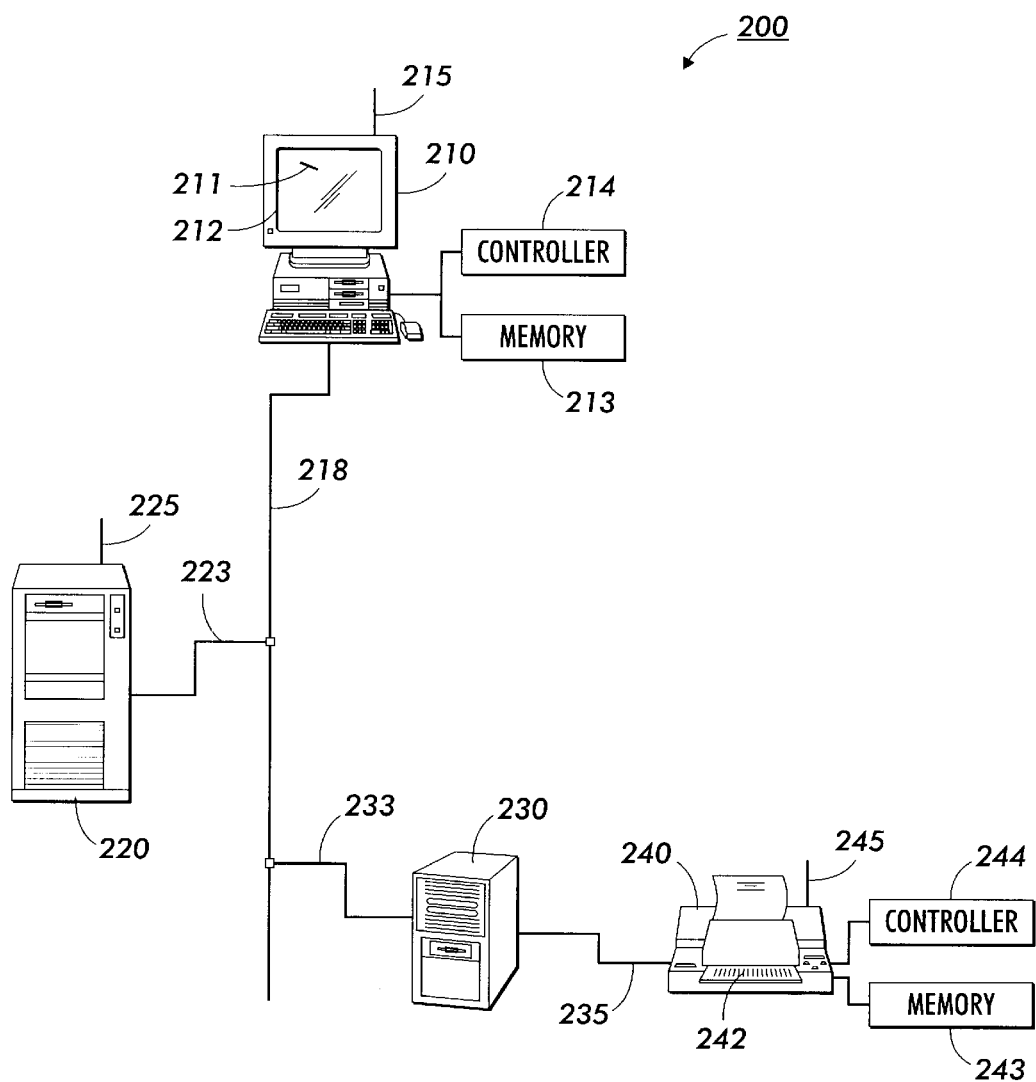
FIG. 2 is a second exemplary embodiment of a device independent color control server according to this invention.

FIG. 2 shows a device independent color control server system incorporating a second exemplary embodiment of a device independent color control (DICC) server system 200 according to this invention. As shown in FIG. 2, the device independent color control (DICC) server system 200 includes at least one color image data source 210, a network 218, at least one device independent color control (DICC) server 220, at least one digital front end (DFE) 230 and at least one associated color marking device 240 having a color sensor 242, a memory 243, a controller 244, and a radio transceiver 245. The elements listed above correspond to and operate similarly to the same elements discussed above with respect to FIG. 1.

However, the at least one color image data source 210 of the device independent color control (DICC) server system 200 also includes a color display monitor 211, a color sensor 212, a memory 213, a controller 214, and a radio transceiver 215.

In the various exemplary embodiments described above, the device independent color control (DICC) server 220 interfaces, for example, with the color sensor 212, and more specifically, with the controller 214, via a wireless link using the radio transceiver 215. Alternatively, the device independent color control (DICC) server 220 can interface with the color sensor 212, and more specifically, with the controller 214, via any linked connection. The linked connection can be any known or later developed device or system for connecting the device independent color control (DICC) server 220 to the color sensor 212, and more specifically, to the controller 214, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connection can be any known or later developed connection system or structure usable to connect the device independent color control (DICC) server 220 to the color sensor 212, and more specifically, to the controller 214, including both wired and wireless connections.

The device independent color control (DICC) server system 200 functions similarly to the device independent color control (DICC) server system 100 described above. In various exemplary embodiments of the device independent color control (DICC) server system 200, the device independent color control (DICC) server 220 transmits a signal causing the color display monitor 211 of the at least one color image data source 210 to display a color patch pattern. The color sensor 212 then measures the patch pattern, as discussed above, with reference to FIG. 1, as it is displayed on the color display monitor 211 of the at least one color image data source 210.

The controller 214 then transmits, via the radio receiver 215, the measured color values detected by the color sensor 212 to the device independent color control (DICC) server 220, as described above with respect to FIG. 1. Next, the device independent color control (DICC) server 220 receives, via the radio transceiver 225, the measured color values.

Once the device independent color control (DICC) server 220 receives the measured color values, the device independent color control (DICC) server 220 analyzes the color levels detected by the color sensor 212. The device independent color control (DICC) server 220 then compares the color levels detected by the color sensor 212 to the color levels of the patch patterns input to the color display monitor 211 of the at least one color image data source 210 and the color levels detected by the color sensor 242 to the color levels of the patch pattern input into the color marking device 240.

If the device independent color control (DICC) server 220 determines that the color levels are not within an acceptable range of equivalents, the device independent color control (DICC) server 220 updates the color modification system, such as, for example, a look-up table, in the device independent color control (DICC) server 220. Thus, the color space of an input job is translated into the current "drift space" of the color display monitor 211, through the use of the updated color modification system. The appropriate control information is then added to the job. Next, the job is submitted to the digital front end (DFE) 230 for interpretation and rasterization and is sent to the color marking device 240 to be outputted.

However, if the device independent color control (DICC) server 220 determines that the color levels are within an acceptable range of equivalents, the device independent color control (DICC) server 220 does not update the color modification system in the device independent color control (DICC) server 220.

Alternatively, if the device independent color control (DICC) server 220 determines that the color levels are not within an acceptable range of equivalents, the device independent color control (DICC) server 220 sends, via the network 218, an updated color modification signal to the color modification system incorporated into the memory 213 of the at least one color image data source 210. However, if the device independent color control (DICC) server 220 determines that the color levels are within an acceptable range of equivalents, the device independent color control (DICC) server 220 does not update the color modification system incorporated in the memory 213 of the at least one color image data source 210.

In the various exemplary embodiments described above, the device independent color control (DICC) server 220 interfaces, for example, with the at least one color image data source 210, and more specifically, with the controller 214, via a wireless link using the radio transceiver 215. Alternatively, the device independent color control (DICC) server 220 can interface with the at least one color image data source 210, and more specifically, with the controller 214, via any linked connection. The linked connection can be any known or later developed device or system for connecting the device independent color control (DICC) server 220 to the at least one color image data source 210, and more specifically, with the controller 214, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connection can be any known or later developed connection system or structure usable to connect the device independent color control (DICC) server 220 interfaces to the at least one color image data source 210, and more specifically, with the controller 214, including both wired and wireless connections.

In the exemplary embodiments described above, it should be understood that the color marking device 240 underwent a color calibration, such as, for example, a color warrantee routine prior to calibrating the color characteristics of the color display monitor 211. However, it should be understood that in various exemplary embodiments, the color display monitor 211 is calibrated first and the at least one color marking device 240 is then calibrated with respect to the color display monitor 211.

It should also be understood that the device independent color control (DICC) server 220 contains the most up-to-date information about the reproduced colors of the color display monitor 211 and the at least one color marking device 240. Thus, to obtain pleasing colors, colors displayed on the color display monitor 211 that are outside the color gamut of the at least one color marking device 240 will be mapped to the best color regions of the at least one color marking device 240 color gamut.

Figure 3:
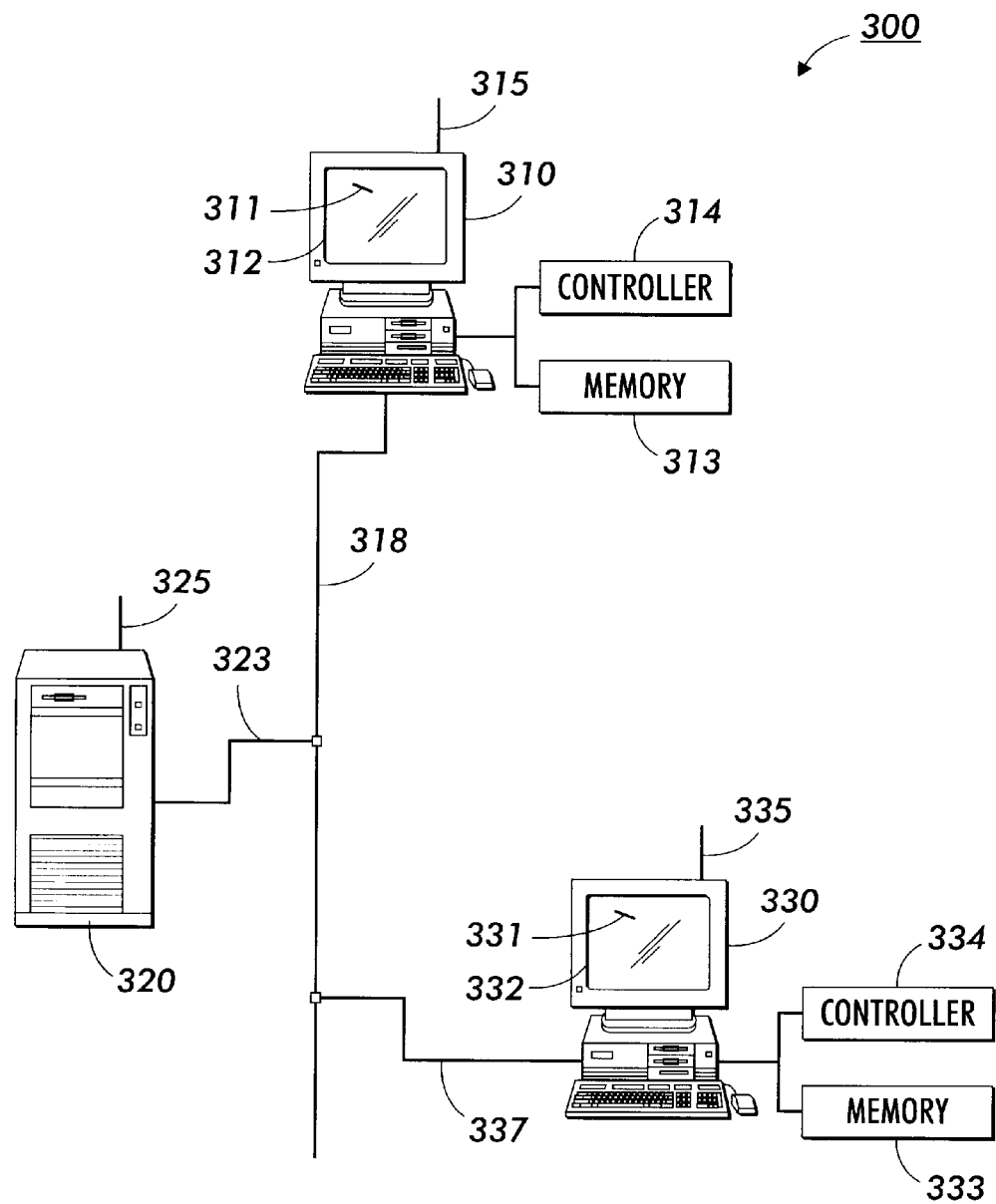
FIG. 3 is a third exemplary embodiment of a device independent color control server according to this invention.

FIG. 3 shows a device independent color control server system incorporating a third exemplary embodiment of a device independent color control (DICC) server system 300 according to this invention. As shown in FIG. 3, the device independent color control (DICC) server system 300 includes at least one first color image data source 310, a color display monitor 311 having a color sensor 312, a memory 313, a controller 314, and a radio transceiver 315, a network 318, and at least one device independent color control (DICC) server 320. The elements listed above correspond to and operate similarly to the same elements discussed above with respect to FIG. 2.

The device independent color control (DICC) server system 300 includes at least one other color image data source 330. The at least one other color image data source 330 has at least the features of the at least one first color image data source 310. The device independent color control (DICC) server system 300 functions similarly to the device independent color control (DICC) server system 200 described above with respect to FIG. 2. In various exemplary embodiments of the device independent color control (DICC) server system 300, the device independent color control (DICC) server 320 transmits a signal to one or more of the at least one other color image data source 330 and/or the at least one first color image data source 310. Using the methods described above with reference to FIGS. 1 and 2, the device independent color control (DICC) server system 300 correlates the color characteristics of the color display monitor 331 of one of the at least one other color image data source 330 to the color characteristics of the color display monitor 311 of the at least one first color image data source 310.

Figure 4:
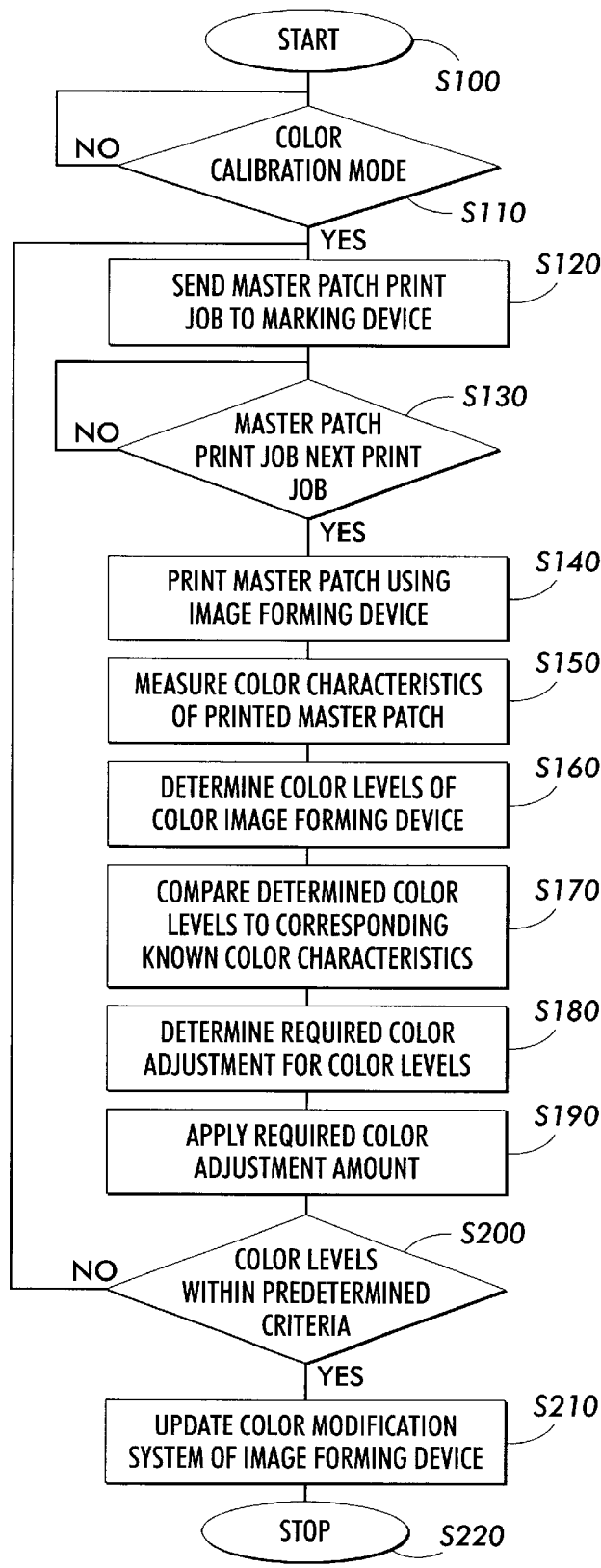
FIG. 4 is a flowchart outlining one embodiment of a control routine using the device independent color control server of this invention.

FIG. 4 is a flowchart outlining one exemplary embodiment of a method for enabling device independent color control for an image forming device according to this invention. In FIG. 4, the method can begin as part of a color warrantee method or, alternatively, by the user initiating the device independent color control methods of this invention.

As shown in FIG. 4, beginning in step S100, control continues to step S110, where a determination is made whether the color calibration mode has been initiated. If, in step S110, the color calibration mode was not initiated, control returns to step S110. Otherwise, control advances to step S120.

In step S120, a master patch print job having known and measurable color characteristics is sent to a designated color image forming device. Next, in step S130, a determination is made whether the sent master patch print job is the next print job in a queue of the designated color image forming device. If, in step S130, the sent master patch print job is not the next print job in the queue of the designated color image forming device, control returns to step S130. Otherwise, control advances to step S140.

In step S140, the designated color image forming device performs the master patch print job by outputting the master patch print. Next, in step S150, a sensor measures the color characteristics of the master patch printed by the designated color image forming device. Then, in step S160, the measured color characteristics of the master patch, as measured by the color sensor, are analyzed and the output color levels of the designated color image forming device are determined. Control then continues to step S170.

Next, in step S170, the determined output color levels of the designated color image forming device are compared to corresponding known color characteristics of the master patch print. Then, in step S180, a required color value adjustment amount is determined for the designated color image forming device based on the comparison.

Next, in step S190, the required color value adjustment amount is applied to the designated color image forming device. In various exemplary embodiments the required color value adjustment amount can be applied as disclosed in the incorporated 203 application. Control then continues to step S200.

In step S200, a determination is made whether the corrected color levels of the designated color image forming device achieve color levels within a desired accuracy. If, in step S200, the desired accuracy is not reached, control jumps back to step S120. Otherwise, control advances to step S210.

In step S210, the color modification system of the designated color image forming device is updated. In various exemplary embodiments, the color modification system can be updated as disclosed in the incorporated 202 application. As a result, all subsequent color images to be printed will be printed using the modified color modification system. Next, in step S220, the method ends.

As shown in FIG. 4, the method for enabling device independent color control for an image forming device according to this invention is preferably implemented on a device independent color control (DICC) server. However, the method for enabling device independent color control for an image forming device can also be implemented on a general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 4, can be used to implement the method for enabling device independent color control for an image forming device.

It should be appreciated that any known or later developed image forming device that produces color output documents could be modified to incorporate the device independent color control (DICC) server systems and methods described herein.

Moreover, the device independent color control (DICC) server systems and methods described herein can be implemented as software executing on a programmed general purpose computer, a special purpose computer, a microprocessor or the like. In this case, the device independent color control (DICC) server systems and methods described herein can be implemented as a routine embedded in a printer driver, as a resource residing on a server, or the like. The device independent color control (DICC) server systems and methods described herein can also be implemented by physically incorporating them into a software and/or hardware system, such as the hardware and software systems of a printer or a digital photocopier.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A color control system, comprising:
   a device independent color control server connectable to a network; and
   at least one color image forming device connectable to the network,
   each color image forming device containing a color modification system, and
   each color image forming device including a color sensor, positioned to measure a color quality of an output image formed by that color image forming device.

2. The color control system of claim 1, wherein the color image forming device is a color marking device.

3. The color control system of claim 2, wherein, for at least some of the color marking devices, the color sensor of such a color marking device is mounted in the output paper path of that color marking device.

4. The color control system of claim 2, wherein, for at least some of the color marking devices, the color sensor of such a color marking device is mounted within the output tray of that color marking device.

5. The color control system of claim 1, wherein the color image forming device is a color display monitor.

6. The color control system of claim 1, wherein the at least one color image forming device is connected to a color modification system.

7. The color control system of claim 1, wherein the color sensor measures at least one or more of an optical density, a trichrometric description, a color coordinates, and a reflectance spectra of the color patch pattern.

8. The color control system of claim 1, wherein the color sensor includes:
   a memory; and
   a controller.

9. The color control system of claim 8, wherein the device independent color control server transmits at least one control signal to a color image forming device including a signal to output a color patch pattern stored in the color sensor memory having at least one measurable color characteristic.

10. The color control system of claim 8, wherein the device independent color control server transmits at least one control signal to a color image forming device including values that change the colors of the color patch pattern stored in the color sensor memory.

11. The color control system of claim 8, wherein controller includes a radio transceiver.

12. The color control system of claim 1, wherein the device independent color control server includes a radio transceiver.

13. The color control system of claim 1, wherein the device independent color control server transmits at least one control signal to a color image forming device.

14. The color control system of claim 13, wherein the at least one control signal includes a color patch pattern having at least one measurable color characteristic.

15. The color control system of claim 14, wherein the device independent color control server compares at least one measurable color characteristic received from a color image forming device to at least one corresponding color characteristic of the color patch pattern.

16. The color control system of claim 15, wherein the device independent color control server updates a color modification system of that color image forming device.

17. The color control system of claim 16, wherein the device independent color control server updates the color modification system based on a comparison of the at least one measurable color characteristic to at least one corresponding color characteristic of the color patch pattern.

18. The color control system of claim 1, further comprising:
   at least one color image data source connectable to a network.

19. The color control system of claim 18, wherein each at least one color image data source is one of a locally or remotely located computer, a personal digital assistant, a scanner, a digital camera, or a facsimile machine.

20. An apparatus for improving color reproduction, comprising:
   a first input/output circuit that transmits a control signal to a control circuit of a color image forming device to output a color patch pattern having measurable color characteristics including one or more of optical density, trichrometric description, and/or reflectance spectra;
   a second input/output circuit that receives at least one measured color characteristic of the output color patch pattern;
   a device independent color processing circuit that determines whether the at least one measured color characteristic of the output color patch pattern is within an acceptable range of equivalents to the corresponding measurable color characteristic of the input color patch pattern in terms of device independent color;
   a first input/output circuit that outputs color modification values to update a color modification system of the color image forming device if the processing circuit determines that the at least one measured color characteristic of the output color patch pattern is not within an acceptable range of equivalents to the corresponding measurable known color characteristic of the input color patch pattern.

21. The apparatus for improving color reproduction of claim 20, wherein the control signal includes a color patch pattern having at least one measurable color characteristic.

22. The apparatus for improving color reproduction of claim 20, wherein the second input/output circuit includes a radio transceiver.

23. A method for improving color reproduction, comprising:

transmitting a control signal to a color image forming device to output a color patch pattern having at least one measurable color characteristic;

outputting a color patch pattern in response to the control signal;

sensing the measurable color characteristics of the output color patch pattern;

analyzing the sensed color characteristics in terms of device independent color;

comparing the analyzed color characteristics to the color characteristics of the transmitted color patch pattern; and updating a color modification system of the color image forming device based on the compared color characteristics.

24. The method of claim 23, wherein transmitting the control signal includes transmitting a signal to output a color patch pattern stored in a color sensor memory having at least one measurable color characteristic.

25. The method of claim 24, wherein transmitting the control signal further includes transmitting values that change the colors of the color patch pattern stored in the color sensor memory.

26. The method of claim 23, wherein transmitting the control signal includes transmitting a color patch pattern having at least one measurable color characteristic.

27. The method of claim 23, wherein sensing the measurable color characteristics includes monitoring the color image forming device until the color patch pattern is the next job to be outputted.

28. The method of claim 23, wherein sensing the measurable color characteristics includes receiving a command indicating that the color patch pattern is the next job to be outputted by the color image forming device.

29. The method of claim 23, wherein sensing the measurable color characteristics includes monitoring all jobs outputted by the color image forming device for the color patch pattern to be outputted.

30. The method of claim 23, wherein sensing the measurable color characteristics includes sensing at least one of an optical density, a trichrometric description, color coordinates, and a reflectance spectra of the color patch pattern.

31. The method of claim 30, wherein the trichrometric description is the color characterization in a device-independent color space.

32. The method of claim 23, wherein the color image forming device is one of a color marking device or a color display monitor.

* * * * *